United States Patent [19]
DiNicola et al.

[11] Patent Number: 5,394,524
[45] Date of Patent: Feb. 28, 1995

[54] METHOD AND APPARATUS FOR PROCESSING TWO GRAPHICS DATA STREAMS IN PARALLEL

[75] Inventors: Paul D. DiNicola, Hurley; Joseph C. Kantz, Saugerties; Omar M. Rahim, Kingston; David A. Rice, New Paltz; Edward M. Ruddick, Woodstock, all of N.Y.

[73] Assignee: International Business Machines Corporation, Armonk, N.Y.

[21] Appl. No.: 983,455

[22] Filed: Nov. 30, 1992

Related U.S. Application Data

[63] Continuation-in-part of Ser. No. 926,724, Aug. 7, 1992, Pat. No. 5,315,701.

[51] Int. Cl.6 .................................................. G06F 3/14
[52] U.S. Cl. ............................................................ 395/163
[58] Field of Search ........ 395/119, 140, 141, 162–164, 395/650, 275, 800; 345/24, 112, 133, 204, 214; 364/200 MS File, 900 MS File, 228

[56] References Cited

U.S. PATENT DOCUMENTS

| | | | |
|---|---|---|---|
| 4,550,386 | 10/1985 | Hirosawa et al. | 364/900 |
| 4,737,921 | 4/1988 | Goldwasser et al. | 395/163 |
| 4,987,550 | 1/1991 | Leonard et al. | 395/150 |
| 5,045,995 | 9/1991 | Levinthal et al. | 364/200 |
| 5,136,693 | 8/1992 | Rice | 364/DIG. 1 |

FOREIGN PATENT DOCUMENTS

WO88/09539 12/1988 WIPO .......................... G06F 15/72
WO89/01664 2/1989 WIPO .......................... G06F 12/02

*Primary Examiner*—Mark R. Powell
*Assistant Examiner*—Kee M. Tung
*Attorney, Agent, or Firm*—William A. Kinnaman; Duke W. Yee; Andrew J. Dillon

[57] ABSTRACT

In a graphics subsystem, a highly interactive two-dimensional (2D) data stream and a computationally intensive three-dimensional (3D) data stream are processed concurrently in such a manner that processing of the 2D data stream is not held up by processing of the 3D data stream. A 3D geometry subsystem having a parallel pipeline architecture is used to process the 3D data stream, while a 2D subsystem concurrently processed the 2D data stream in parallel with the 3D subsystem. A reordering device couples the processed 2D and 3D data streams to a common raster subsystem. The reordering device, which contains an internal buffer, reorders any order-dependent elements of the 3D data stream appearing at the output of the 3D geometry subsystem in an order different from the order in which they were supplied to the input end. The reordering device prioritizes the 2D data stream relative to the 3D data stream so that elements of the 2D data stream arriving from the 2D subsystem are passed to the raster subsystem almost immediately, without having to wait for elements of the 3D data stream.

16 Claims, 6 Drawing Sheets

METHOD AND APPARATUS FOR PROCESSING TWO GRAPHICS DATA STREAMS IN PARALLEL

REFERENCE TO RELATED APPLICATION

This application is a continuation-in-part of application Ser. No. 07/926,724, filed Aug. 7, 1992, now U.S. Pat. No. 5,315,701, entitled "A Method and System for Processing Graphics Data Streams Utilizing Scalable Processing Nodes".

BACKGROUND OF THE INVENTION

1. Field of the Invention

The present invention relates in general to a method and system for improved graphical computation and in particular to a method and system for utilizing graphical computation to process a data stream. Still more particularly, the present invention relates to a method and system of graphical computation to efficiently process a graphics data stream.

2. Description of the Related Art

Data processing systems such as personal computers and workstations are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modelling applications. CAD/CAM/CASE applications are normally graphics intensive in terms of the information relayed to the user. Other data processing system users may employ other graphics intensive applications such as desktop publishing applications.

Ideally, such systems should be able to process two graphics data streams in parallel and interleave the resulting drawing information without mutual interference. One of the data streams might consist of two-dimensional (2D) drawing primitives and window manipulation commands, while the other might be primarily three-dimensional (3D) drawing primitives and attributes. The 3D data stream processing should be extremely high performance, while the 2D processing should be very low latency. In addition, the time required to swap between these two data streams should be minimal. The system should be able to use current processor technology. Overall, the system should provide consistent high-performance, low-latency 2D processing in conjunction with providing a scalable range of 3D processing.

Systems which are currently on the market providing 2D and 3D data stream support process these data streams sequentially, i.e., by time-multiplexing them on a single processor or processor complex. They process one data stream for a period of time, then they process the second for a period of time, and then they return to the first. This approach is an unacceptable solution since intermixing a data stream which is computationally intensive with one that is highly interactive generally degrades both. The computationally intensive one (3D) does not get as much processor time as it might, and the interactive one (2D) must wait for the 3D data stream to be processed before getting an opportunity to display the interactive information that the user is waiting for. Currently available systems require large amounts of context information to be swapped in order to switch from processing 3D information to processing 2D information and back.

A system which provides for fast 3D graphics running alongside (or within) an interactive 2D windowed environment (e.g., X Windows) requires a system which can process these two data streams efficiently without mutual interference. However, the traditional approach of time-slicing between the two types of data streams can cause serious performance problems, as noted above.

SUMMARY OF THE INVENTION

In general, the present invention contemplates a scalable parallel pipeline graphics system with separate processor complexes for the 2D data stream (the control processor) and for the 3D data stream (attribute and node processors). The 3D subsystem is optimized to provide extremely high floating-point performance, which is required for 3D graphics. The 2D subsystem has less processing capacity, but has faster, more direct access to the raster subsystem that is used to actually modify the pixels seen on the screen.

In accordance with the present invention, a composite graphics data stream comprising a highly interactive 2D data stream and a computationally intensive 3D data stream is partitioned into its constituent 2D and 3D streams, which are sent to separate 2D and 3D subsystems operating in parallel with one another. The processed 2D and 3D data streams are coupled to a common raster subsystem by a reordering device or prioritizer, which prioritizes the 2D data stream relative to the 3D stream so that elements of the 2D data stream arriving from the 2D subsystem are passed to the raster subsystem almost immediately, without having to wait for elements of the 3D data stream.

Preferably, the 3D subsystem comprises a parallel pipeline system having a plurality of processing nodes, each of which contains a processor pipeline. Segments of the 3D data stream are distributed to the various processing nodes in such a manner as to balance the workload among the nodes. To maintain the relative sequence of 3D primitives that must be processed by the raster subsystem in a given order (and are therefore order dependent), the 3D segments are assigned sequence numbers as they are distributed to the processing nodes. Successively dispatched order-independent segments are assigned the same sequence number, while order-dependent segments are assigned successively increasing sequence numbers. In addition to the sequence numbers, end tags are sent to the processing nodes to indicate hiatuses in the incoming 3D data stream.

Segments of the 2D data stream that are sent to the 2D subsystem are not assigned sequence numbers; although the processing of these segments is generally order dependent, they necessarily retain their original order since, unlike the 3D subsystem, the 2D subsystem does not have parallel processing channels. On the other hand, as in the 3D subsystem, end tags are sent to the 2D subsystem to indicate hiatuses in the incoming 2D data stream.

The prioritizer interposed between the 2D and 3D subsystems and the raster subsystem has a 2D port for the 2D subsystem and a 3D port for each processing node of the 3D subsystem. Each port has associated with it a FIFO for buffering incoming data pending its further processing. In general, the prioritizer processes the 3D data (by dispatching it to the raster subsystem) in order of sequence number, so that order-dependent primitives maintain their original sequence. The prioritizer services each of the 3D ports in turn in recirculating fashion, servicing a given port until it encounters either a new sequence number or an end tag indicating a temporarily empty port. Before proceeding to service the next 3D port, however, the prioritizer checks the 2D port to determine whether it is empty. If not, the prioritizer services the 2D port until it encounters an end tag (indicating a gap in the 2D data stream), at which time it switches to the next 3D port.

The primary advantage of this system over the prior art is that it allows the 2D and 3D data streams to be processed concurrently and interleaved in such a way that the 2D data stream is not forced to wait for large amounts of 3D data to be processed before it can be processed.

As an example, in some systems, if a computationally intense piece of 3D work is given to the system to do (such as a NURBS surface or a high quality factor circle), all 2D work on the system must stop while the 3D computations are completed. The 3D work may take many seconds or even minutes to complete. During this time, if the user wants to pop up a menu or open a new window, he will find that the system will not respond to the request until the 3D work is done. This is very disconcerting to the user and may even lead him to believe that the system is dead. In the present system, by contrast, the 3D output is temporarily interrupted while the 2D work goes on, so the menu or window appears almost as quickly as if the 3D work were not going on. Furthermore, the 3D output only is affected. The 3D processing continues with the output being buffered until the prioritizer again selects the 3D subsystem. Note that 3D processing is never halted.

The separate 2D subsystem, with a direct, prioritized path into the raster subsystem via the prioritizer, provides the consistent high-performance,-low-latency processing for a 2D (e.g., X Windows) data stream in conjunction with a 3D subsystem which is independently scalable to meet a range of processing needs.

An additional advantage of this system is the reduction in the amount of data which must be saved and restored when switching between the 3D and 2D processing. In current systems, since a single processor or processor complex is processing both data streams, it must completely save the state of the process in order to switch from one to the other; in the case of a 3D process, this is typically a large amount of data. In the present system, this is unnecessary, since the state of each process is maintained on independent processors in the 2D and 3D subsystems.

The above as well as additional objects, features, and advantages of the present invention will become apparent in the following detailed written description.

DESCRIPTION OF THE PREFERRED EMBODIMENT

Figure 1:
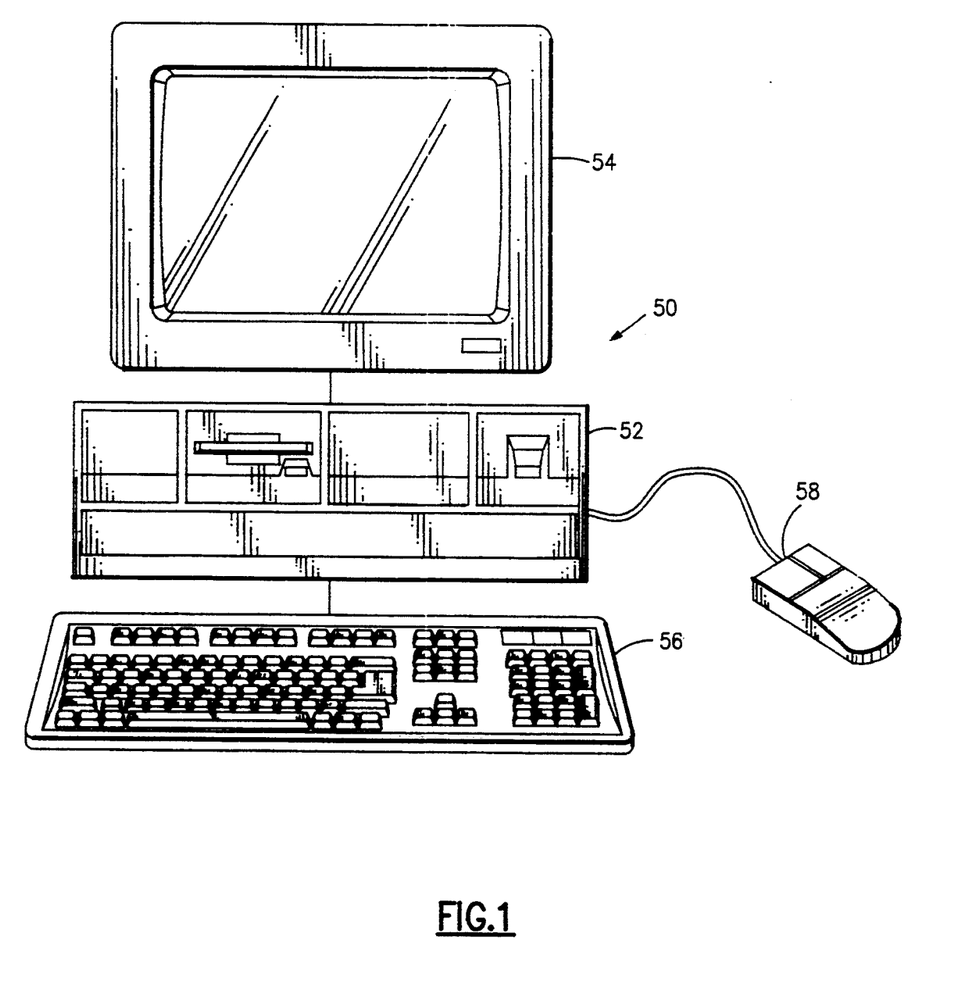
FIG. 1 depicts a pictorial representation of a computer system in which the present invention may be implemented in accordance with a preferred embodiment of the present invention.

With reference now to the figures and in particular with reference to FIG. 1, there is depicted a pictorial representation of a computer system in which the present invention may be implemented in accordance with a preferred embodiment of the present invention. A computer 50 is depicted which includes a system unit 52, a video display terminal 54, a keyboard 56, and a mouse 58. Computer 50 may be implemented utilizing any suitable computer such as an IBM PS/2® personal computer or an IBM RISC System/6000® workstation, both products of International Business Machines Corporation. (RISC System/6000 and PS/2 are registered trademarks of International Business Machines Corporation.) A preferred embodiment of the present invention may be implemented in other types of data processing systems, for example, host-attached graphics systems such as the IBM 5080 and 6090 graphics systems or minicomputers.

Figure 2:
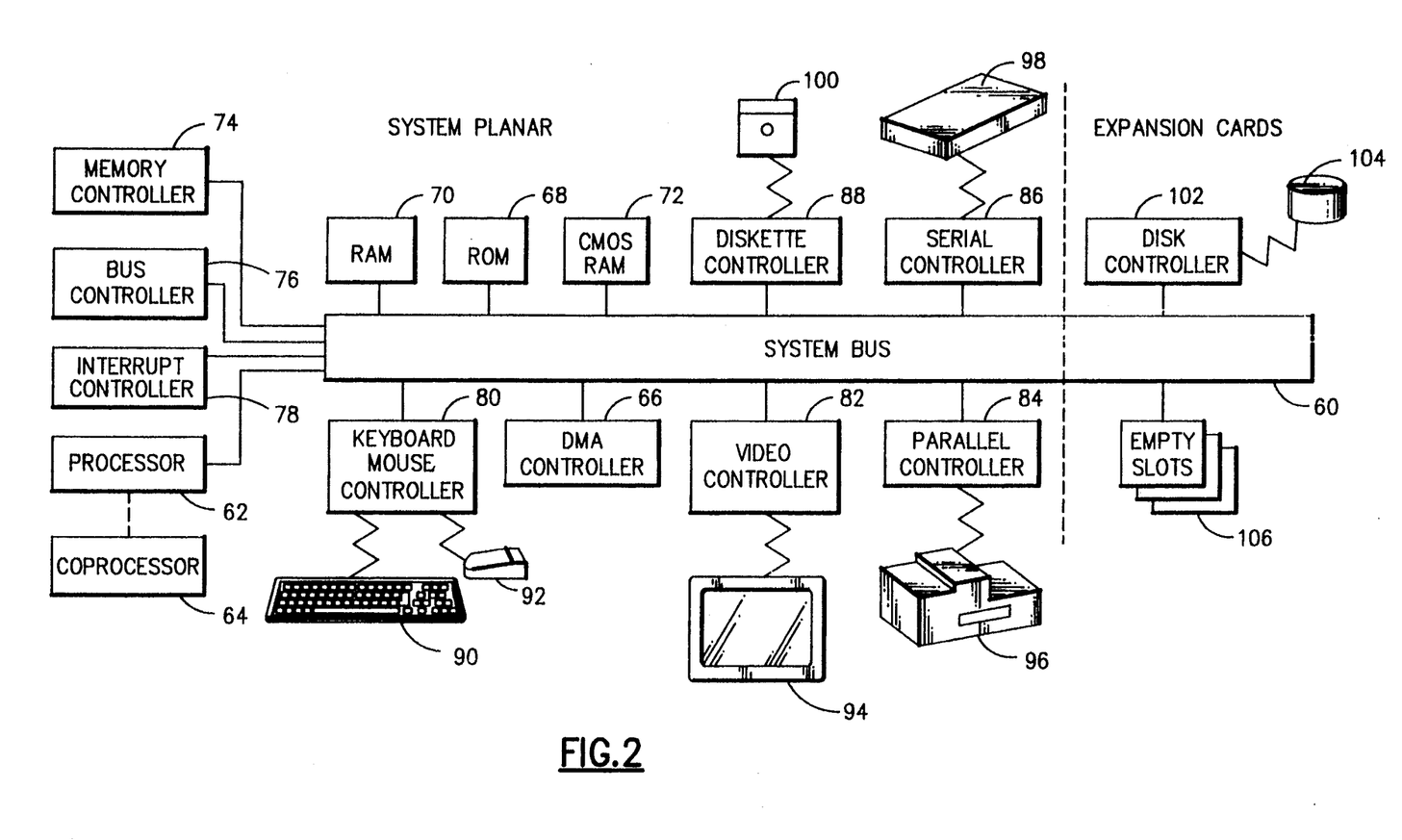
FIG. 2 is a block diagram of selected components in a personal computer in which a preferred embodiment of the present invention may be implemented.

Referring now to FIG. 2, there is depicted a block diagram of selected components in computer 50 in which a preferred embodiment of the present invention may be implemented. System unit 52 preferably includes a system bus 60 for interconnecting and establishing communication between various components in system unit 52. Microprocessor 62 is connected to system bus 60 and may also have numeric coprocessor 64 connected to it. DMA controller 66 is also connected to system bus 60 and allows various devices to appropriate cycles from microprocessor 62 during large I/O transfers.

Read only memory (ROM) 68 is mapped into the microprocessor 62 address space. Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provides a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards may also be added to system bus 60, such as disk controller 102, which provides a hardware interface for hard disk unit 104. Empty slots 106 are provided so that other peripherals, adapters, and devices may be added to system unit 52. A preferred embodiment of the present invention may be added to system unit 52 in the form of a graphics adapter placed into empty slots 106.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like may also be utilized in addition to or in place of the hardware already depicted.

In accordance with a preferred embodiment of the present invention, processors may be arranged in parallel pipelines to form processing nodes. These processing nodes are utilized to perform the bulk of the graphics computations for a data processing system. The processors receive data from input communications paths and perform required computations, such as transformations, clipping, lighting, etc. Each processor in a processing node passes intermediate data to the following processor to allow it to continue the calculations. This allows the computations to be spread among the processors within a processing node. Each processor may have its own memory, and the communications paths are designed to allow data movement to occur without impacting the ability of the processors to access their code and data memory in accordance with a preferred embodiment of the present invention.

Figure 3:
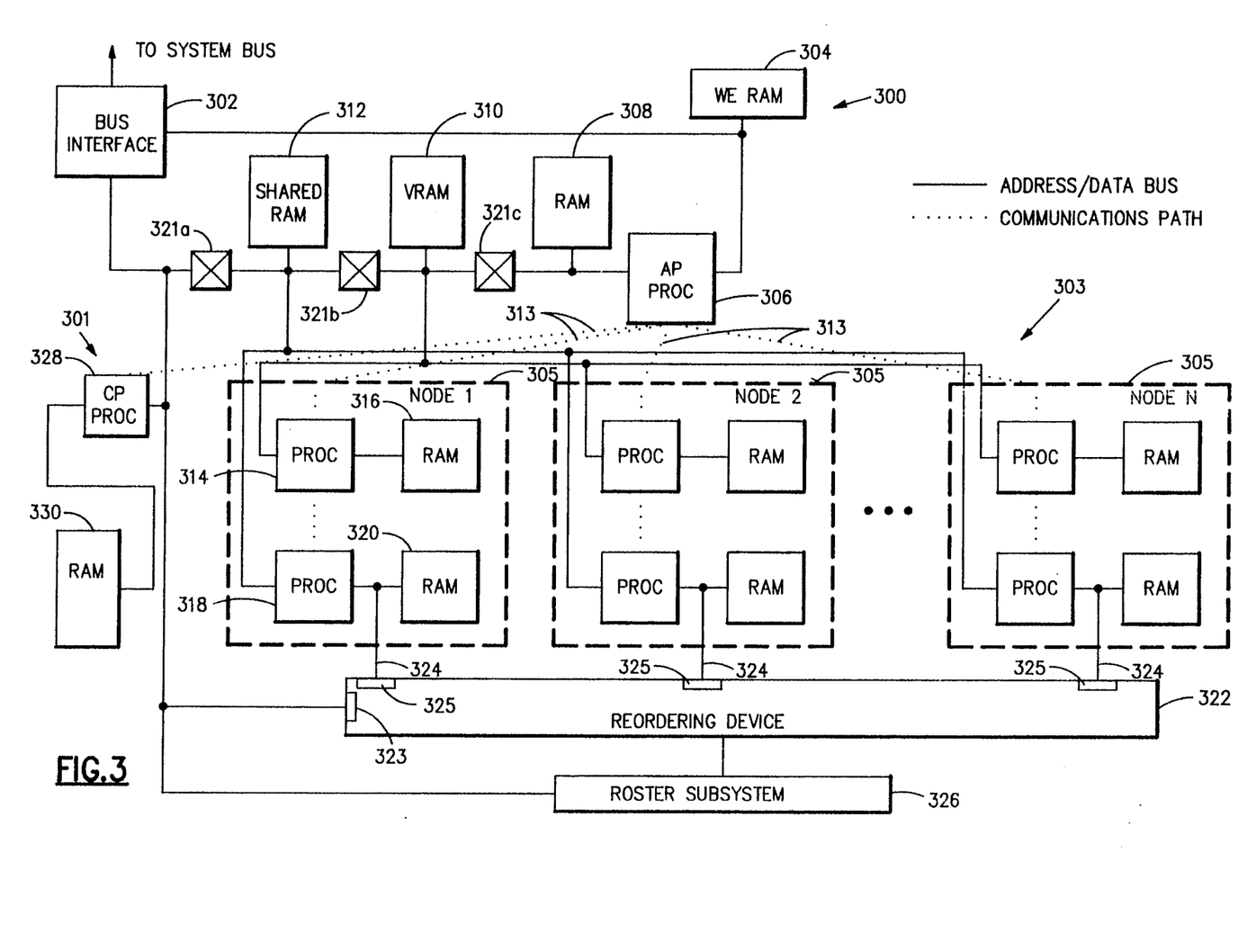
FIG. 3 depicts a block diagram of a graphics subsystem constructed in accordance with a preferred embodiment of the present invention.

FIG. 3 is a block diagram of a graphics subsystem 300 constructed in accordance with a preferred embodiment of the present invention. Graphics subsystem 300, which is contained within video controller 82 (FIG. 2), includes a 2D subsystem 301 and a 3D subsystem 303. The 3D subsystem 303 is in turn formed of a plurality of processing pipelines or nodes 305, as described below.

Graphics subsystem 300 receives interleaved 2D and 3D graphics data streams through a bus interface 302, which is coupled to the system bus 60 of the host system 52 utilizing presently available techniques well known to those skilled in the art. The 3D graphics data stream may be divided up or partitioned into Work Elements. A Work Element (WE) may be (1) a drawing primitive, which is a command to draw, i.e., a line, a polygon, a triangle, or text; (2) an attribute primitive, which is a command to change an attribute, also called an attribute change, i.e. color or line style, or (3) a context primitive, which is context information for an area of display or a window. Both the 2D and the 3D graphics data stream may be stored in a work element RAM 304.

An attribute processor (AP) 306 performs preprocessing of the incoming 2D and 3D data streams (such as graphics attribute processing) and dispatches work to the 3D processing nodes 305 or to the 2D subsystem 301, as appropriate. Attribute processor 306 may be either a suitably programmed general-purpose processor or a special-purpose logic circuit.

Attribute processor 306 reads work from an input FIFO, memory or other input path and moves work groups to the appropriate processing node 305. This processor is also responsible for operations such as including a sequence number with the work groups so that the work groups may be reordered after processing by the processing nodes 305. Also, for some graphics data streams, the processor may perform display list processing and non-drawing processing.

Attribute processor 306 is utilized to parse or partition the 3D data stream into multiple segments in accordance with a preferred embodiment of the present invention. Each segment is also called a work group (WG), and each work group may contain one or more work elements. The number of work elements in a work group may be determined by various factors such as the amount of processing time that it takes to process a work group versus the amount of processing time it takes to group work elements into a work group. Attribute processor 306 is coupled to a RAM 308, which is employed to store various instructions or data utilized by attribute processor 306. Additionally, attribute processor 306 may move data by utilizing other devices such as DMA controllers, processors, or with internal features within the attribute processor itself. Attribute processor 306 may perform graphics processing and supply current attribute data to the processing nodes 305 along with the work to be done.

A video RAM (VRAM) 310 stores attribute information, in the form of processed attribute primitives, from the data streams along with font information and other context-related data in accordance with a preferred embodiment of the present invention. Attribute processor 306 copies attribute data from the graphics data streams into VRAM 310. A shared RAM 312 is utilized to store font and context data. Both VRAM 310 and shared RAM 312 are shared memory areas utilized for storing globally accessed data, such as graphics context information, fonts, and attribute data. This type of memory may be accessible by all of the processors, but is accessed relatively infrequently. As a result, contention for bus access to this type of memory has minimal impact on performance.

Attribute processor 306 distributes work groups to the processing nodes 305 through communications paths 313. Communications paths 313 are utilized for passing data between the various processors in accordance with a preferred embodiment of the present invention. These communications paths may be memory ports, or any type of hardware well known to those skilled in the art that provides a data path to another processor.

Although not necessary for an Understanding of the present invention, further details of the operation of attribute processor 306 and other elements of the graphics subsystem 300 may be found in the above-identified copending application Ser. No. 07/926,724, the specification of which is incorporated herein by reference.

Each of the processing nodes 305 includes a first processor 314 coupled to a RAM 316 and a second processor 318 coupled to a RAM 320. Processor 314 and processor 318 are serially coupled to each other. Processors 314 and 318 are TMS320C40 processors manufactured by Texas Instruments Incorporated in accordance with a preferred embodiment of the present invention. Information on programming and utilizing TMS320C40 processors may be found in *TMS320C4x User's Guide*, available from Texas Instruments Incorporated. RAM 316 and RAM 320 are utilized to store instructions and data for processor 314 and processor 318 respectively.

The number of processing nodes 305 may vary in accordance with a preferred embodiment of the present invention. Although the depicted embodiment shows only two processors per processing node 305, it is contemplated that other numbers of processors may be utilized in each processing node. Additionally, if more than one processor is in a processing node 305, it is not necessary that all of the processors in the processing node be of the same type or make.

Processing nodes 305 are separated by bus transceivers 321a, 321b, and 321c, which are well known in the art. These bus transceivers control access to VRAM 310 and Shared RAM 312 by the processing nodes 305. Closing the bus transceivers creates a single bus, while opening the bus transceivers creates two buses. When the bus transceivers are all open, node processors 318 have access to shared RAM 312, while node processors 314 have access to VRAM 310. Closing all of the bus transceivers results in all of the processors in the processing nodes 305 being able to access both shared RAM 312 and VRAM 310. Although only three bus transceivers and one shared RAM and one VRAM are shown in the depicted embodiment, other numbers of bus transceivers, and various numbers and types of RAM may be utilized in accordance with a preferred embodiment of the present invention.

As work groups are processed within the processing nodes 305, the processed work groups are sent from the processing nodes, via a bus 324, to a reordering device 322 en route to a raster subsystem 326.

Reordering device 322 combines the processed 3D data from the processing nodes 305 into a single 3D data stream for transmission to the raster subsystem 326. Reordering device 322 also merges the processed 3D data stream from 3D subsystem 303 with the processed 2D data stream from 2D subsystem 301 to form a single combined data stream for the raster subsystem 326. In this particular embodiment, reordering device 322 is an application-specific integrated circuit (ASIC). However, reordering device 322 may also be a processor or other specialized logic circuit.

As noted above, processed work groups are recombined to produce a processed graphics data stream, which is sent to raster subsystem 326, which may be an specialized ASIC or a processor, for display of a pixel image on video display terminal 94 (FIG. 2). The reordering or recombining of the processed work groups is accomplished by assigning a tag or sequence number to each work group in accordance with a preferred embodiment of the present invention. Reordering device 322 utilizes the synchronization tags to determine the order in which to place work groups to produce a data stream.

In some cases, the order in which work groups are placed may be extremely important, and in other cases, the order of work groups may be unimportant. As a result, in addition to dividing up a graphics data stream into segments, attribute processor 306 may be utilized to determine the order in which the segments are reordered or reassembled at reordering device 322 in accordance with a preferred embodiment of the present invention. Furthermore, attribute processor 306 determines whether or not the order of a work group is important and assigns synchronization tags or sequence numbers to each work group to reflect this in accordance with a preferred embodiment of the present invention. This determination may be dependent on various factors such as the type of graphics data stream being processed or their drawing locations on the screen. These synchronization tags or sequence numbers are utilized by reordering device 322 to determine the order in which to send processed graphics data to raster subsystem 326 in accordance with a preferred embodiment of the present invention. Work groups which do not require any temporal order may be assigned the same synchronization tag or sequence number. Reordering device 322 passes these primitives to raster subsystem 326 as it encounters them; it will not force one to be drawn before another. When order-dependent primitives are encountered, attribute processor 306 assigns successive sequence numbers that are then used by reordering device 322 to output the primitives in the correct order to raster subsystem 326. The disclosed system thus allows those primitives that can be drawn without regard to order to be drawn at will, while those that must be drawn sequentially are drawn sequentially.

Reordering device 322 has a 2D port 323 for receiving the processed 2D data stream from 2D subsystem 301 and a 3D port 325 for receiving processed 3D data from each processing node 305 of 3D subsystem 303; each 3D port 325 is associated with a particular node 305 of the 3D subsystem 303.

Figure 4:
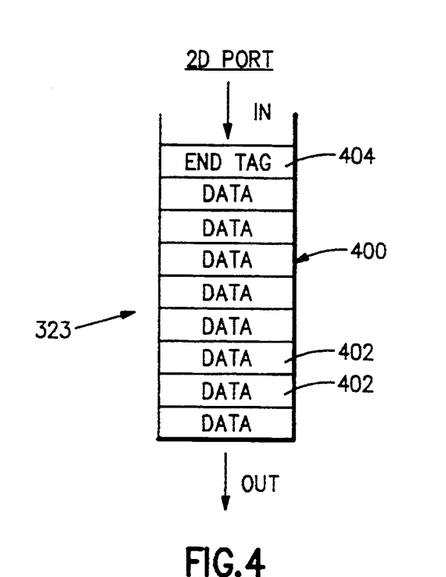
FIG. 4 is a block diagram of the FIFO associated with the 2D port of the reordering device shown in FIG. 3.

Referring now to FIG. 4, associated with the 2D port 323 of reordering device 322 is a FIFO 400 for receiving and storing the 2D data stream from 2D subsystem 301 while awaiting dispatching to raster subsystem 326. Incoming elements are added to the top of the occupied area of FIFO 400 as shown in the figure, while outgoing elements are removed from the bottom of the occupied FIFO area as shown in the same figure. Any suitable means known in the art, such as pointers to an addressable memory, may be used to realize FIFO 400. At a given instant in time, FIFO 400 might contain a plurality of data entries 402, constituting elements of the processed data stream from 2D subsystem 301, and an "end" tag 404 at the top of the occupied buffer area indicating a gap in the 2D data stream. In the embodiment shown, end tag 404 is added to the stream either by attribute processor 306 or by the 2D subsystem processor (to be described) when it detects a gap in the 2D data stream.

Figure 5:
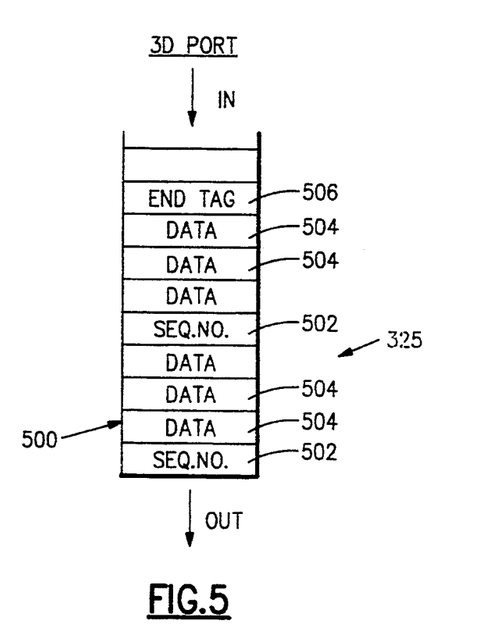
FIG. 5 is a block diagram of the FIFO associated with each 3D port of the reordering device shown in FIG. 3.

In a similar manner, referring now to FIG. 5, associated with each 3D port 325 of reordering device 322 is a FIFO 500 for receiving and storing 3D data from the corresponding node 305 of 3D subsystem 303 while awaiting dispatching to raster subsystem 326. As with the 2D FIFO 400, incoming elements of the 3D data stream are added to the top of the occupied area of each FIFO 500 as shown in FIG. 5, while outgoing elements are removed from the bottom of the occupied FIFO area as shown in the same figure. Any suitable means known in the art, such as pointers to an addressable memory, may be used to realize FIFO 500. At a given instant in time, each 3D FIFO 500 might contain a plurality of groups of data entries 504 constituting elements of the processed 3D data stream from the corresponding processing node 305 of 3D subsystem 303, with each group of entries being preceded by a sequence number 502 for that group. An "end" tag 506 at the top of the occupied buffer area indicates a gap in the 3D data stream. In the embodiment shown, attribute processor 306 adds sequence numbers 502 to the portions of the 3D data stream that it distributes to the processing nodes 305 to indicate the order in which the primitives are to be recombined for processing by raster subsystem 326. Attribute processor 306 adds end tag 404 to each distributed portion of the 3D data stream when it detects a gap in the 3D data stream.

Reordering device 322 recombines 3D data arriving from the various nodes 305 in such a manner as to ensure that the data reaches raster subsystem 326 in the correct order. Reordering device 322 receives the sequence number 502 of each primitive, as indicated above, and selects the next sequential primitive to draw. The sequence number is incremented after each order-dependent primitive (or set of order-independent primitives) is passed to the raster subsystem 326. FIFOs 400 and 500 contain sufficient buffering capability to allow the 2D subsystem 301 and the processing nodes 305 to write their output to the reordering device 322 and continue processing, even if their output data is not currently selected. Preferably, reordering device 322 also allows data to be routed back to the main processor 62 of the host system 52 (FIG. 2) so that the output can be further processed on the main processor.

The port 323 dedicated to the 2D subsystem 301 is designed to have higher priority than the 3D ports 325. When data is supplied to the 2D port 323, reordering device 322 switches to that port at the next opportunity, i.e., when it encounters a new sequence number 502 or an "end" tag 506 in the 3D port 325 which it is currently servicing. This is done to ensure that the drawing primitive which is being generated by the node 305 can be completed before the 2D subsystem 301 begins its work.

The 2D subsystem 301 contains a control processor (CP) 328 and a RAM 330 that is coupled to the control processor. RAM 330 is utilized by control processor 328 to store information and hold instructions. Control processor 328 is coupled to attribute processor 306 via a communications path 313 and shared memory 310 and 312. Attribute processor 306 moves 2D data stream elements from the work element RAM 304 to control processor 328 for processing. This data moves from attribute processor 306 to control processor 328 over the communications path 313. This occurs in parallel with the movement of data to the 3D nodes 305. Control processor 328 is also coupled to reordering device 322 via the 2D port 323.

Control processor 328 performs all 2D computations and control functions such as window clip management. Control processor 328 is also utilized to manage raster subsystem 326 and bus interface 302. In addition, control processor 328 assists in rendering operations such as some bit block transfer (BitBLt) operations, which involve copying a block of bits from one place to another; i.e., screen to screen, screen to system, or system to screen. For BitBLT operations, control processor 328 controls raster subsystem 326 and bus interface 302 and sets up DMA operations and sources and destinations for the BitBLT.

Control processor 328 processes the 2D commands and routes its output to the 2D port 323 of reordering device 322. As noted above, the 2D port 323 is designed so that the presence of 2D data in the port signals reordering device 322 to switch away from the 3D subsystem 303 and to start moving data to raster subsystem 326 from the 2D port. This allows the 2D subsystem 301 to interrupt the 3D output data to do the highly interactive work and then to resume the 3D work where it left off. While the 2D subsystem 301 is selected by reordering device 322, the 3D subsystem 303 is still free to continue processing and storing up output (in the FIFOs 500 of 3D ports 325) for the time when the 2D subsystem 301 completes its work and 3D subsystem 303 is again selected by the reordering device.

Figure 6:
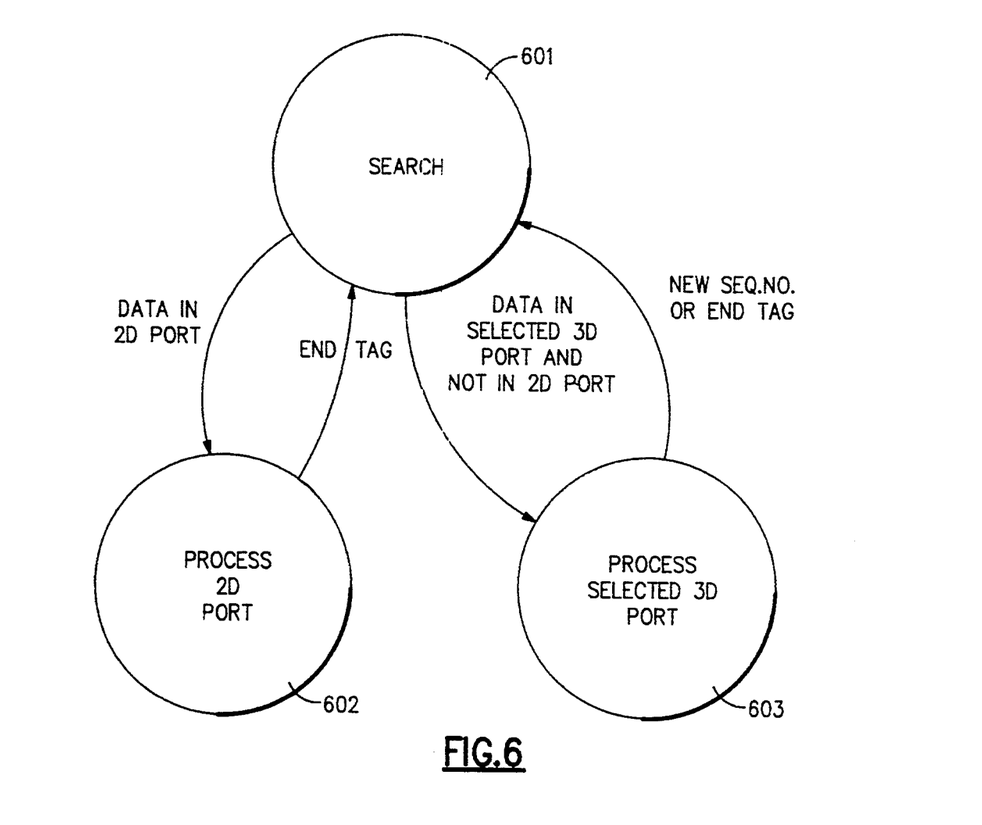
FIG. 6 is a state diagram illustrating how the reordering device interleaves servicing of its 2D and 3D ports.

FIG. 6 is a state diagram illustrating the operation of reordering device 322. Initially, reordering device 322 is in state 601 (SEARCH), in which it looks for a nonempty 2D port 323 or 3D port 325. If there is data in the FIFO 400 (FIG. 4) associated with the 2D port 323 from control processor 328, reordering device 322 enters state 602 (PROCESS CP FIFO), in which it processes this data by forwarding it to raster subsystem 326 until the FIFO has been emptied as indicated by an end tag 404. The reordering device 322 then reverts back to state 601, in which it searches for the next nonempty 3D port 325 having data for the current sequence number. If there is such a port 325, the reordering device 322 enters state 603 (PROCESS SELECTED FIFO), in which it services that port by transferring the data from the port FIFO 500 (FIG. 5) to the raster subsystem 326 until a new sequence number 502 or an end tag 506 is encountered. The reordering device 322 then returns to state 601, where it operates as described above.

Figures 7, 7B:
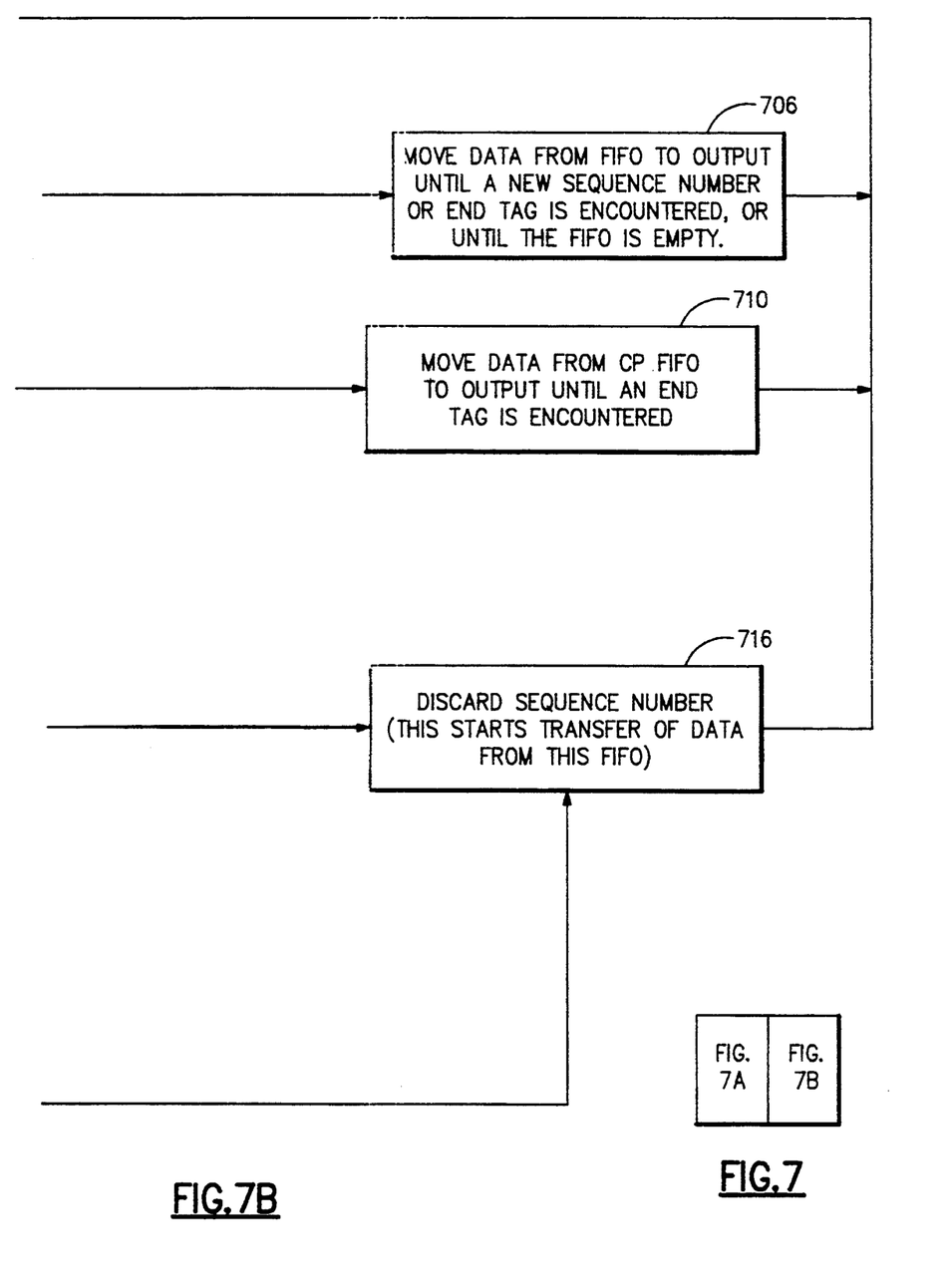
FIG. 7 depicts a high level flowchart of a method and system for recombining processed Work Groups.
Figure 7A:
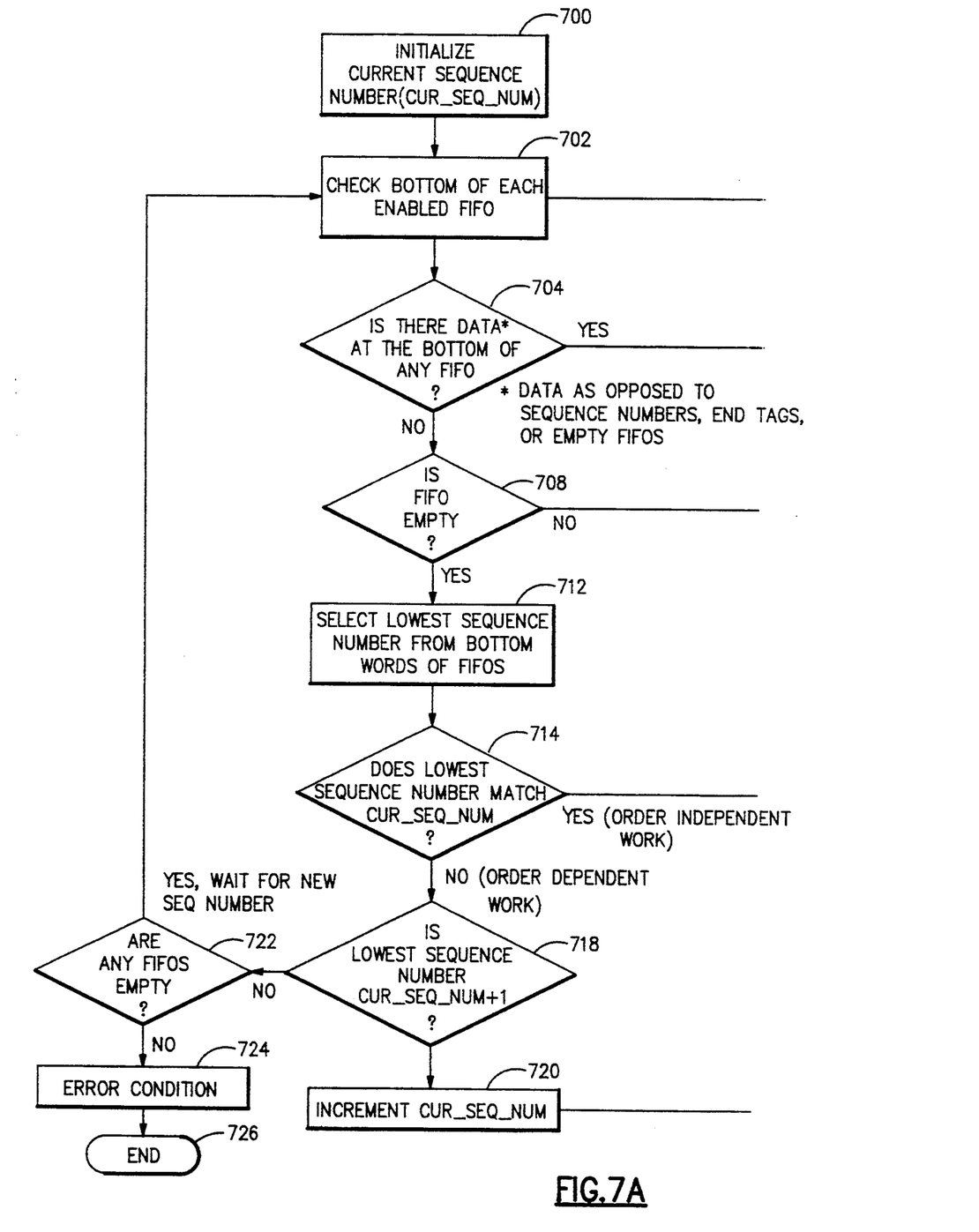

FIG. 7 is a high-level flowchart of the manner in which reordering device 322 services the FIFOs 400 and 500 associated with its input ports 323 and 325. Processed 2D data 402 from control processor 328 is placed in the FIFO 400 of 2D port 323; processed 3D data 504 from each processing node 305 is placed in the FIFO 500 of the corresponding 3D port 325 to be recombined into a processed 3D data stream.

Reordering device 322 reads data 504 from the 3D FIFOs 500 one word 504 at a time; a word may vary in size, such as, for example, 32 bits. The process begins as illustrated in block 700, which depicts the initialization of the current sequence number, cur_seq_num, which is set to some value, usually zero. Thereafter, the process proceeds to block 702, which illustrates the checking or scanning of the bottom of each 3D FIFO 500 that is enabled. A FIFO 500 is enabled if data has been processed by the processing node 305 associated with the FIFO.

Next, the process proceeds to block 704, which depicts a determination of whether or not data 504 is present at the bottom of any 3D FIFO 500. Data does not include sequence numbers 502 or end tags 506. If data 504 is present at the bottom of the FIFO 500, the process proceeds to block 706, which illustrates the movement of data from a FIFO to an output of reordering device 322 until a new sequence number 502 or an end tag 506 is encountered. Afterwards, the process returns to block 702.

Referring back to block 704, if no data 504 is present at the bottom of any FIFO 500, the process then proceeds to block 708, which depicts a determination of whether or not the control processor (2D) FIFO 400 is empty. If the FIFO 400 is not empty, the process proceeds to block 710, which illustrates the movement of data 402 from the FIFO 400 to an output until an end tag 404 is encountered. Thereafter the process returns to block 702.

Referring back to block 710, if the control processor FIFO 400 is empty, the process proceeds to block 712, which depicts the selection of the lowest sequence number 502 from the bottom words of the 3D FIFOs 500 for processing. Afterwards, the process proceeds to block 714, which illustrates a determination of whether or not the lowest sequence number 502 matches cur_seq_num. If the lowest sequence number 502 matches cur_seq_num, the work is order independent and the process proceeds to block 716, which depicts the discarding of the sequence number, which in turn starts the transfer of data 504 from the FIFO 500 to the output of the reordering device 322. Thereafter, the process returns to block 702.

Referring back to block 714, if the lowest sequence number 502 does not match cur_seq_num, the work is order dependent and the process proceeds instead to block 718, which illustrates a determination of whether or not the lowest sequence number is equal to cur_seq_num + 1. If the lowest sequence number 502 is equal to cur_seq_num + 1, the process then proceeds to block 720, which depicts the incrementing of the cur_seq_num by one. Thereafter the process proceeds to block 718, which illustrates the discarding of the sequence number 502, which starts the transfer of data 504 to the output of the reordering device from the FIFO. Thereafter, the process returns to block 702.

Referring again to block 718, if the lowest sequence number is not equal to cur_seq_num + 1, the process proceeds to block 722, which depicts a determination of whether or not any of the 3D FIFOs 500 are empty. If none of the FIFOs 500 are empty, the process proceeds to block 724, which illustrates the sending of a message that an error condition occurs. Thereafter, the process terminates as illustrated in block 726. As a result, the process will have to be reinitialized.

Referring back to block 722, if one or more of the 3D FIFOs 500 are empty, the process returns to block 702.

While the invention has been particularly shown and described with reference to a preferred embodiment, it will be understood by those skilled in the art that various changes in form and detail may be made therein without departing from the spirit and scope of the invention. Thus, while the disclosed system uses a dedicated 2D subsystem to process the 2D data stream, the 2D data stream may alternatively be handled by one or more processing nodes of a single parallel pipeline subsystem. Conversely, the 3D subsystem may consist of a single processing pipeline rather than parallel pipelines as disclosed. Also, while the input data stream is a multiplexed data stream, the 2D and 3D data streams could be entirely separate before being merged into an output stream. In addition, other events such as the lapse of a set time period could be used to trigger the switching between the 2D and 3D data streams.

What is claimed is:

1. Apparatus for concurrently processing first and second graphics data streams, comprising:
   first processing means for processing said first data stream to generate a processed first data stream, said first processing means having an output for providing said processed first data stream;
   second processing means for processing said second data stream to generate a processed second data stream, said second processing means having an output for providing said processed second data stream;
   third processing means for further processing said processed first and second data streams to generate a displayable image; and
   means for alternatingly coupling the outputs of said first and second processing means to said third processing means so that said processed first data stream is sent to said third processing means without having to wait for completion of processing of said second data stream by said second processing means,
   wherein said first data stream comprises two-dimensional (2D) graphics Primitives while said second data stream comprises three-dimensional (3D) graphics primitives.

2. Apparatus for concurrently processing first and second graphics data streams, comprising:
   first processing means for processing said first data stream to generate a processed first data stream, said first processing means having an output for providing said processed first data stream;
   second processing means for processing said second data stream to generate a processed second data stream, said second processing means having an output for providing said processed second data stream;
   third processing means for further processing said processed first and second data streams to generate a displayable image; and
   means for alternatingly coupling the outputs of said first and second processing means to said third processing means so that said processed first data stream is sent to said
   third processing means without having to wait for completion of processing of said second data stream by said second processing means,
   wherein said third processing means comprises rasterizing means for converting said processed first and second data streams to a pixel image.

3. Apparatus for concurrently processing first and second graphics data streams, comprising:
   first processing means for processing said first data stream to generate a processed first data Stream, said first processing means having an output for providing said processed first data stream;
   second processing means for processing said second data stream to generate a processed second data stream, said second processing means having an output for providing said processed second data stream;
   third processing means for further processing said processed first and second data streams to generate a displayable image;
   means for alternatingly coupling the outputs of said first and second processing means to said third processing means so that said processed first data stream is sent to said third processing means without having to wait for completion of processing of said second data stream by said second processing means;
   means for supplying a composite data stream comprising said first and second data streams; and
   means for partitioning said composite data stream into said first and second data streams and for directing said first and second data streams to said first and second processing means.

4. Apparatus for concurrently processing first and second graphics data streams, comprising:
   first processing means for processing said first data stream to generate a processed first data stream, said first processing means having an output for providing said processed first data stream;
   second processing means for processing said second data stream to generate a processed second data stream, said second processing means having an output for providing said processed second data stream;
   third processing means for further processing said processed first and second data streams to generate a displayable image: and means for alternately coupling the outputs of said first and second processing means to said third processing means so that said processed first data stream is sent to said third processing means without having to wait for completion of processing of said second data stream by said second processing means, wherein said processing means comprises a plurality of processing nodes for processing segments of said second data stream in parallel with one another, said apparatus comprising means for partitioning said second data stream into said segments and for distributing said segments to said processing nodes and wherein said coupling means recombines the segments processed by said processing nodes to form a single processed second data stream.

5. Apparatus as in claim 4 in which said coupling means interleavingly couples the outputs of said processing nodes to said third processing means.

6. Apparatus as in claim 5 in which said coupling means couples the output of said first processing means to said third processing means each time an output from one said plurality of processing nodes is coupled to said third processing means.

7. Apparatus for concurrently processing first and second graphics data streams, comprising:
first processing means for processing said first data stream to generate a processed first data stream, said first processing means having an output for providing said processed first data stream;
second processing means for processing said second data stream to generate a processed second data stream, said second processing means having an output for providing said processed second data stream;
third processing means for further processing said processed first and second data streams to generate a displayable image; and
means for alternately coupling the outputs of said first and second processing means to said third processing means so that said processed first data stream is sent to said third processing means without having to wait for completion of processing of said second data stream by said second processing means, wherein said processing means comprises a plurality of processing nodes for processing segments of said second data stream in parallel with one another, said apparatus comprising means for partitioning said second data stream into said segments and for distributing said segments to said processing nodes and wherein said partitioning means adds sequence numbers to said segments of said second data stream indicating a desired order of recombination, said coupling means recombining the segments processed by said processing nodes in the order indicated by said sequence numbers to form a single processed second data stream.

8. Apparatus as in claim 7 in which said coupling means couples the output of said first processing means to said third processing means upon encountering a new sequence number in a segment processed by one of said processing nodes.

9. A method for concurrently processing first and second graphics data streams, comprising the steps of:
processing said first data stream to generate a processed first data stream;
processing said second data stream to generate a processed second data stream;
alternately coupling said processed first and second data streams to an output data stream so that said processed first data stream is coupled to Said output data stream without having to wait for completion of processing of said second data stream; and
processing said output data stream to generate a displayable image,
wherein said first data stream comprises two-dimensional (2D) graphics primitives while said second data stream comprises three-dimensional (3D) graphics primitives.

10. A method for concurrently processing first and second graphics data streams, comprising the steps of:
processing said first data stream to generate a processed first data stream;
processing said second data stream to generate a processed second data stream;
alternately coupling said processed first and second data streams to an output data stream so that said processed first data stream is coupled to said output data stream without having to wait for completion of processing of said second data stream; and
processing said output data stream to generate a displayable image,
wherein said output data stream is rasterized to convert said output data stream to a pixel image, 11. A method for concurrently processing first and second graphics data streams, comprising the steps of:
processing said first data stream to generate a processed first data stream;
processing said second data stream to generate a processed second data stream;
alternately coupling said processed first and second data streams to an output data stream so that said processed first data stream is coupled to said output data stream without having to wait for completion of processing of said second data stream;
processing said output data stream to generate a displayable image;.
providing a composite data stream comprising said first and second data streams; and
partitioning said composite data stream into said first and second data streams.

12. A method for concurrently processing first and second graphics data streams, comprising the steps of:
processing said first data stream to generate a processed first data stream;
processing said second data stream to generate a processed second data stream;
alternately coupling said processed first and second data streams to an output data stream so that said processed first data stream is coupled to said output data stream without having to wait for completion of processing of said second data stream; and
processing said output data stream to generate a displayable image,
wherein a plurality of processing nodes process segments of said second data stream in parallel with one another, said second data stream being partitioned into said segments that are distributed to said processing nodes and said segments processed by said processing nodes are recombined to form said output data stream.

13. A method as in claim 12 in which the outputs of said processing nodes are interleavingly coupled to said output data stream.

14. A method as in claim 13 in which said first processed data stream is coupled to said output data stream between the times that successive processing nodes are coupled to said output data stream.

15. A method for concurrently processing first and second graphics data streams, comprising the steps of:
   processing said first data stream to generate a processed first data stream;
   processing said second data stream to generate a processed second data stream;
   alternatingly coupling said processed first and second data streams to an output stream so that said processed first data stream is coupled to said output stream without having to wait for completion of processing of said second data stream; and
   processing said output data stream to generate a displayable image, wherein sequence numbers indicating a desired order of recombination are added to said segments of said second data stream, the segments processed by said processing nodes being recombined in the order indicated by said sequence numbers to form said output data stream.

16. A method as in claim 15 in which said processed first data stream is coupled to said output data stream upon encountering a new sequence number in a segment processed by one of said processing nodes.

* * * * *